United States Patent
Sharma et al.

(10) Patent No.: US 9,900,359 B2
(45) Date of Patent: *Feb. 20, 2018

(54) SYSTEM AND METHOD FOR SUPPORTING VIDEO PROCESSING LOAD BALANCING FOR USER ACCOUNT MANAGEMENT IN A COMPUTING ENVIRONMENT

(71) Applicant: Oracle International Corporation, Redwood Shores, CA (US)

(72) Inventors: Himanshu Sharma, Redwood Shores, CA (US); Sudhir Kumar Srinivasan, San Jose, CA (US); Ramaprakash Sathyanarayan, Redwood Shores, CA (US); Arun Theebaprakasam, Fremont, CA (US); Buddhika Kottahachchi, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/635,758

(22) Filed: Mar. 2, 2015

(65) Prior Publication Data
US 2016/0088045 A1  Mar. 24, 2016

Related U.S. Application Data

(63) Continuation of application No. 14/494,738, filed on Sep. 24, 2014, now Pat. No. 9,148,454.

(51) Int. Cl.
*G06F 15/16* (2006.01)
*H04L 29/06* (2006.01)
(Continued)

(52) U.S. Cl.
CPC ........ *H04L 65/60* (2013.01); *H04L 29/08072* (2013.01); *H04L 65/1066* (2013.01); *H04L 65/1069* (2013.01)

(58) Field of Classification Search
CPC . H04L 65/608; H04L 65/602; H04L 65/1069; H04L 65/60; H04L 67/10;
(Continued)

(56) References Cited

U.S. PATENT DOCUMENTS 5,852,436 A     12/1998  Franklin et al.
6,748,019 B1 *   6/2004  Lin ..................... H04N 19/176
                                                    375/240.24

(Continued)

OTHER PUBLICATIONS

© Stepok Image Lab. 2007-2013, Screen Anytime v4.5 Administrator Manual, Document version v4.5, Jun. 20, 2013, 25 pages.

(Continued)

*Primary Examiner* — Zarni Maung
(74) *Attorney, Agent, or Firm* — Tucker Ellis LLP

(57) ABSTRACT

A system and method can support user account management in a computing environment. The computing environment can include a video encoding pool to support load balancing and a managing server, such as a privileged account manager server. The video encoding pool includes a set of nodes that are able to perform one or more video processing tasks for another node. Furthermore, the managing server can receive a request from a managed node in the computing environment for delegating a video processing task, and can select one or more nodes from the video encoding pool to load balance and to perform the video processing task.

30 Claims, 10 Drawing Sheets

(51) Int. Cl.
*H04L 29/08* (2006.01)
*G06F 12/00* (2006.01)

(58) Field of Classification Search
CPC ... H04L 67/14; H04L 65/4084; H04L 67/141; H04L 65/80; H04L 43/0876; H04L 65/4069; H04L 29/06027; H04L 47/70; H04L 63/0428; H04L 63/0435; H04L 63/0807
USPC .................................. 709/203, 223–229, 250
See application file for complete search history.

(56) References Cited

U.S. PATENT DOCUMENTS

| | | | |
|---|---|---|---|
| 7,613,290 | B2 | 11/2009 | Williams et al. |
| 7,620,895 | B2 | 11/2009 | Adkins et al. |
| 7,627,821 | B2 | 12/2009 | Klementiev |
| 7,673,340 | B1 | 3/2010 | Cohen et al. |
| 9,148,454 | B1* | 9/2015 | Sharma ............... H04L 65/1066 |
| 2002/0038388 | A1 | 3/2002 | Netter |
| 2002/0106190 | A1 | 8/2002 | Nygren et al. |
| 2005/0216527 | A1 | 9/2005 | Erlingsson |
| 2007/0083821 | A1 | 4/2007 | Garbow et al. |
| 2007/0101353 | A1 | 5/2007 | Jeong et al. |
| 2007/0130292 | A1 | 6/2007 | Tzruya et al. |
| 2007/0136235 | A1 | 6/2007 | Hess |
| 2007/0191966 | A1 | 8/2007 | Fisher et al. |
| 2007/0300161 | A1 | 12/2007 | Bhatia et al. |
| 2007/0300179 | A1 | 12/2007 | Friedlander |
| 2008/0084470 | A1* | 4/2008 | Hamilton ............ H04L 12/1827 348/14.09 |
| 2008/0115143 | A1* | 5/2008 | Shimizu ................ G06F 9/5066 718/105 |
| 2008/0222532 | A1 | 9/2008 | Mester et al. |
| 2011/0023115 | A1 | 1/2011 | Wright |
| 2011/0184982 | A1 | 7/2011 | Adamousky et al. |
| 2011/0276685 | A1 | 11/2011 | de Waal et al. |
| 2011/0288931 | A1 | 11/2011 | Kuhn et al. |
| 2011/0296001 | A1 | 12/2011 | Ramstrom |
| 2012/0131456 | A1 | 5/2012 | Lin et al. |
| 2012/0159324 | A1 | 6/2012 | Chavez et al. |
| 2012/0194691 | A1 | 8/2012 | Yasutomi |
| 2013/0083843 | A1 | 4/2013 | Bennett |
| 2013/0254333 | A1* | 9/2013 | Lyon .................. H04N 21/2385 709/217 |
| 2013/0332987 | A1 | 12/2013 | Tenneti et al. |
| 2014/0057238 | A1 | 2/2014 | Okamoto et al. |
| 2014/0149496 | A1 | 5/2014 | Lee et al. |

OTHER PUBLICATIONS

Recordts Installation Guide version 2.0, TSFactory LLC. © 2005-2010, updated May 1, 2010, 21 pages.
Softactivity TS Monitor 3.5—software for Windows Terminal Server monitoring, © 2000-2014, Deep Software Inc., retrieved from: <http://www.softactivity.com/tsm.aspx>, Aug. 20, 2014, 5 pages.
Censornet Desktop Surveillance from © 2005-2013 Censornet Ltd. retrieved from: <http://www.censornet.com/en/products/desktopsurveillance>, Aug. 20, 2014, 2 pages.
Censornet Desktop Surveillance Product Features of Desktop Surveillance from © 2005-2013 Censornet Ltd., retrieved from: <http://www.censornet.com/en/products/desktopsurveillance/features>, Aug. 20, 2014, 1 page.
Shin-Hung Chang et al., "SGA: A Sporadic GDI Adapter for Smooth Motion Recording on Computer Screen" (Abstract), published in: Embedded and Ubiquitous Computing (EUC), 2011 IFIP 9th International Conference on Oct. 24-26, 2011, retrieved from: <http://ieeexplore.ieee.org/xpl/articleDetails.jsp?tp=&arnumber=6104537>, Aug. 20, 2014, 2 pages.
T. Sasaki et al., "An Exploratory Study on the Impact of Usage of Screenshot in Software Inspection Recording Activity", Published in: Software Measurement, 2011 Joint Conference of the 21st Int'l Workshop on and 6th Int'l Conference on Software Process and Product Measurement (IWSM-MENSURA) on Nov. 3-4, 2011, retrieved from: <http://ieeexplore.ieee.org/xpl/articleDetails.jsp?tp=&arnumber=6113068>, Aug. 20, 2014, 2 pages.
J.J. Schultz et al., "An efficient scheme for chaining with client-centric buffer reservation for multi-media streaming", Published in: Simulation Symposium, 2003, 36th Annual: Date of Conference: Mar. 30-Apr. 2, 2003, retrieved from <http://ieeexplore.ieee.org/xpl/articleDetailsjsp?tp=&arnumber=1192795>, Aug. 20, 2014, 2 pages.
Cybele Software, ThinRDP, © 2011-2014 by Cybele Software Inc., retrieved from: <http://www.cybelesoft.com/thinrdp/>, Aug. 20, 2014, 2 pages.
ObserveIT, Record and Replay Windows Sessions, retrieved from <http://www.observeit.com/Products/Features/Windows>, Aug. 20, 2014, 2 pages.
ObserveIT, ObserveIT Enterprise for User Activity Monitoring: Get Compliant with Citrix, SSH and RDP Recording, retrieved from <http://www.observeit.com/Products>, Aug. 20, 2014, 2 pages.
*ObserveIT, Video Activity Analysis of Every Recorded Session*, retrieved from <http://www.observeit.com/Products/Features/Video-Activity-Analysis>, Aug. 20, 2014, 2 pages.
*Wallix Adminbastion (WAB)*, retrieved from <http://www.wallix.com/images/Plaquettes/datasheetwabV4EN.pdf>, Aug. 21, 2014, 4 pages.
Remotespark, HTML5 Solution—one ultimate solution for all OS and devices, retrieved from <http://www.remotespark.com/htm15.html>, Aug. 21, 2014, 4 pages.
Cyberark, Ensure the controls are in place to centrally secure, manage and monitor privileged accounts, retrieved from <http://www.cyberark.com/solution-detail/control-and-accountability-privileged-users-solutions#.U8ipXuOSyGM>, Aug. 21, 2014, 5 pages.
Cyberark, Control & monitor "who" can initiate and "what" can be done in privileged sessions, retrieved from <http://www.cyberark.com/solution-detail/monitor-record-privileged-activity-solutions#.U8ipxOOSyGM >, Aug. 21, 2014, 4 pages.
Cyberark, Ensure that remote access is secure, controlled and monitored, retrieved from <http://www.cyberark.com/solution-detail/remote-access-control-solutions#.U8iyOeOSyGM>, Aug. 21, 2014, 4 pages.
Hitachi ID Systems, Inc., Hitachi ID Privileged Access Manager, © Hitachi ID Systems, Inc. 2014, retrieved from <http://hitachi-id.com/privileged-access-manager/>, Aug. 21, 2014, 1 page.
Hitachi ID Systems, Inc., Hitachi ID Privileged Access Manager, © Hitachi ID Systems, Inc. 2014, retrieved from <http://hitachi-id.com/privileged-access-manager/overview/>, Aug. 21, 2014, 2 pages.
Hitachi ID Systems, Inc., Hitachi ID Privileged Access Manager, © Hitachi ID Systems, Inc. 2014, retrieved from <http://hitachi-id.com/privileged-access-manager/overview/screen-recordings.html>, Aug. 21, 2014, 3 pages.
Ericom, PowerTerm WebConnect RemoteView, Copyright ©2014 Ericom® Software, retrieved from <http://www.ericom.com/webconnect_remoteview_features.asp>, Aug. 21, 2014, 2 pages.
ObserveIT, Customizable Recording Policies, retrieved from <http://www.observeit.com/Products/Features/Customizable-Recording-Policies>, Aug. 21, 2014, 2 pages.
ObserveIT, How ObserveIT Works: Monitoring TS, Citrix, Vmware and SSH session, retrieved from <http://www.observeit.com/Products/How_It_Works>, Aug. 21, 2014, 2 pages.
ObserveIT, Database Management, retrieved from <http://www.observeit.com/Products/Features/Database_Management>, Aug. 21, 2014, 2 pages.
ObserveIT, Threat Detection Console, retrieved from <http://www.observeit.com/Products/Features/Threat-Detection-Console>, Aug. 21, 2014, 2 pages.
ObserveIT, Advanced Keylogging Capabilities, retrieved from <http://www.observeit.com/Products/Features/Advanced-Keylogging-Capabilities>, Aug. 21, 2014, 2 pages.

(56) References Cited

OTHER PUBLICATIONS

ObserveIT, ObserveIT User Session Auditor Feature List, retrieved from <http://www.observeit.com/Products/Features>, Aug. 21, 2014, 4 pages.
ObserveIT, Privileged User Identification, retrieved from <http://www.observeit.com/Products/Features/Privileged_User Identification>, Aug. 21, 2014, 2 pages.
ObserveIT, Product Integrations, retrieved from <http://www.observeit.com/Products/Integrations>, Aug. 21, 2014, 2 pages.
ObserveIT, Architecture, retrieved from <http://www.observeit.com/Products/Architecture>, Aug. 21, 2014, 2 pages.
ObserveIT, Version Comparison User Auditing Options, retrieved from <http://www.observeit.com/Products/Versions>, Aug. 26, 2014, 1 page.
ObserveIT, Managing ObserveIT Storage, retrieved from <http://www.observeit.com/products/documentation/index.htm>, Sep. 5, 2014, 2 pages.
ObserveIT, Recording Metadata Information, retrieved from <http://www.observeit.com/products/documentation/index.htm>, Sep. 5, 2014, 3 pages.
ObserveIT, Recording User Sessions, retrieved from <http://www.observeit.com/products/documentation/index.htm>, Sep. 5, 2014, 2 pages.
ObserveIT, Replaying User Sessions, retrieved from <http://www.observeit.com/products/documentation/index.htm>, Sep. 5, 2014, 2 pages.
ObserveIT, Server Diary, retreived from <http://www.observeit.com/products/documentation/index.htm>, Sep. 5, 2014, 6 pages.
ObserveIT, Web Management Console, retrieved from <http://www.observeit.com/products/documentation/index.htm>, Sep. 5, 2014, 4 pages.

\* cited by examiner

SYSTEM AND METHOD FOR SUPPORTING VIDEO PROCESSING LOAD BALANCING FOR USER ACCOUNT MANAGEMENT IN A COMPUTING ENVIRONMENT

CLAIM OF PRIORITY

This application is a continuation of U.S. patent application Ser. No. 14/494,738, filed Sep. 24, 2014, entitled "SYSTEM AND METHOD FOR SUPPORTING VIDEO PROCESSING LOAD BALANCING FOR USER ACCOUNT MANAGEMENT IN A COMPUTING ENVIRONMENT", now U.S. Pat. No. 9,148,454, which application is incorporated herein by reference in its entirety. All of which applications are incorporated herein by reference in their entireties.

CROSS REFERENCE TO RELATED APPLICATIONS

The present application is related to the following patents and patent applications which are incorporated herein by reference in their entireties:

U.S. patent application Ser. No. 14/494,728, filed Sep. 24, 2014 entitled "SYSTEM AND METHOD FOR OPTIMIZING VISUAL SESSION RECORDING FOR USER ACCOUNT MANAGEMENT IN A COMPUTING ENVIRONMENT", now U.S. Pat. No. 9,185,175;

U.S. patent application Ser. No. 14/494,732, filed Sep. 24, 2014 entitled "SYSTEM AND METHOD FOR USING POLICIES TO SUPPORT SESSION RECORDING FOR USER ACCOUNT MANAGEMENT IN A COMPUTING ENVIRONMENT", now U.S. Pat. No. 9,167,047; and U.S. patent application Ser. No. 14/494,737, field Sep. 24, 2014, entitled "SYSTEM AND METHOD FOR SUPPORTING DYNAMIC OFFLOADING OF VIDEO PROCESSING FOR USER ACCOUNT MANAGEMENT IN A COMPUTING ENVIRONMENT", now U.S. Pat. No. 9,166,897.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to user account management in a computing environment.

BACKGROUND

As the enterprise/cloud applications and systems become more complex, the task of preventing inappropriate access to various user accounts and the task of detecting unauthorized activities by many different users become extremely challenging. This is the general area that embodiments of the invention are intended to address.

SUMMARY

Described herein are systems and methods that can support user account management in a computing environment. The computing environment can include a video encoding pool to support load balancing and a managing server, such as a privileged account manager server. The video encoding pool includes a set of nodes that are able to perform one or more video processing tasks for another node. Furthermore, the managing server can receive a request from a managed node in the computing environment for delegating a video processing task, and can select one or more nodes from the video encoding pool to load balance and to perform the video processing task.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Oracle Privileged Account Manager (OPAM) system as an example for a user account management system. It will be apparent to those skilled in the art that other types of user account management system can be used without limitation.

Described herein are systems and methods that can support user account management in a computing environment.

Privileged Account Manager

Figure 1:
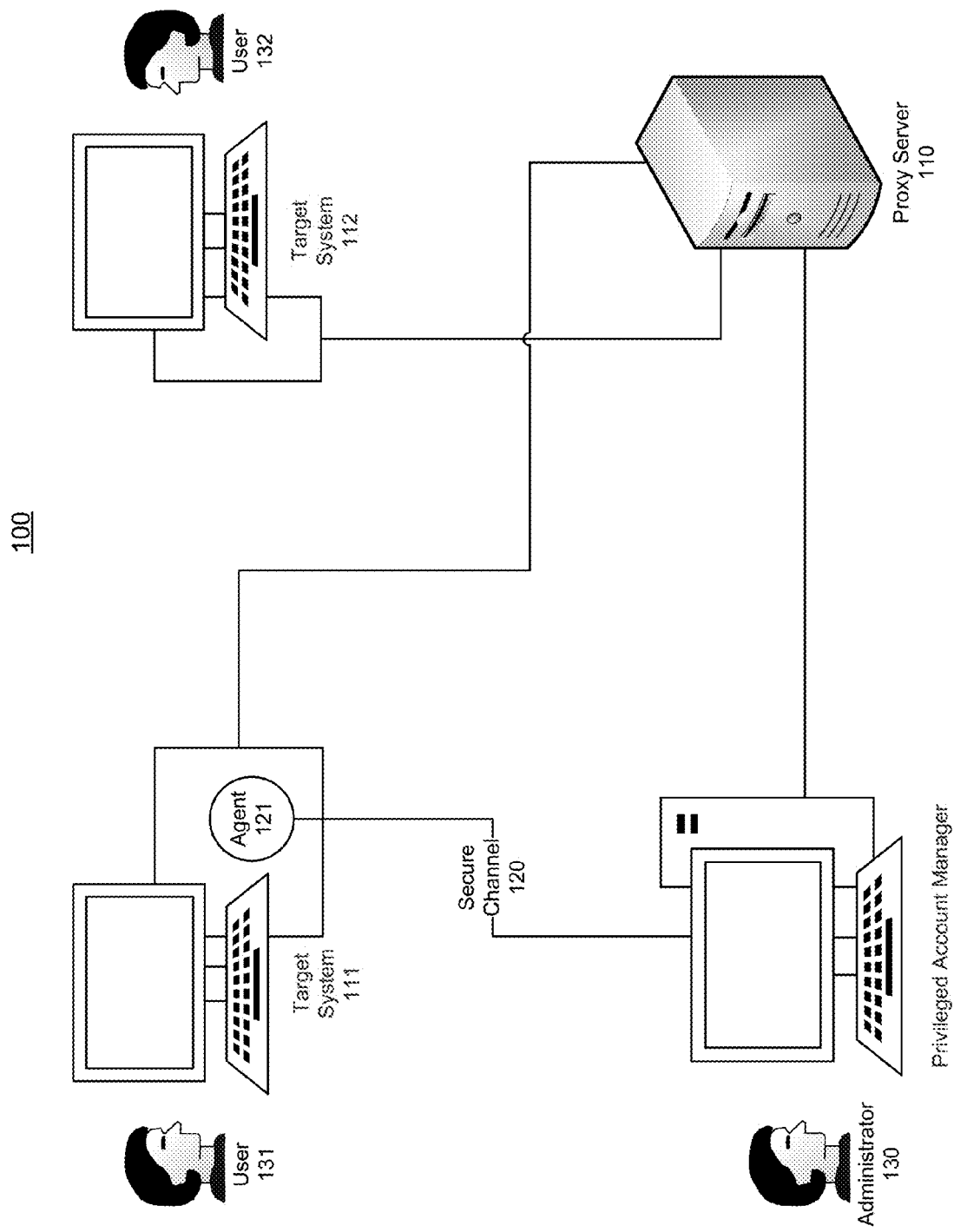
FIG. 1 shows an illustration of an account management system in a computing environment, in accordance with an embodiment of the invention.

FIG. 1 shows an illustration of an account management system in a computing environment, in accordance with an embodiment of the invention. As shown in FIG. 1, an account manager, such as a privileged account manager 101, can monitor and record user sessions (e.g. by users 131-132) on one or more target systems 111-112 in a computing environment 100.

The privileged account manager 101, e.g. an Oracle Privileged Account Manager (OPAM), is a server that is capable of managing privileged accounts and user sessions on the target systems 111-112. The privileged account, such as a root account in a UNIX system or a system account in a database system, can be shared by multiple users 131-132 and can also be role-based.

The target systems 111-112 are the remote targets, which have privileged accounts managed by the privileged account manager 101. The privileged account manager 101 can manage different types of user sessions on the target systems 111-112. For example, these user sessions can include Microsoft Windows sessions, Linux X11 sessions, virtual network computing (VNC) sessions, and Mac OS X remote desktop sessions.

As shown in FIG. 1, an agent 121 can be deployed on a target system 111 for monitoring one or more user sessions on the target system 111. The agent 121 can record user activities within a user session and communicates with the privileged account manager 101 (e.g. for obtaining screen comparison rules and sending back recorded data).

In accordance with an embodiment of the invention, the agent 121 can be physically deployed on the target system 111. The agent 121 can subscribe to a graphical user interface (GUI) rendering system, such as the windowing system, on the target system 111 to obtain various application GUI state information, such as the title of the window for the active application in the foreground. Furthermore, the agent 121 can communicate with the privileged account manager 101 using a secure channel 120, e.g. based on the secure shell (SSH)/transport layer security (TLS) protocols.

Alternatively, the privileged account manager 101 can take advantage of a proxy server 110, which can monitor and record user sessions on the target systems 111-112. For example, the proxy server 110 can be used to collect session information on the different target systems 111-112, such as textual information (e.g. the commands and key strokes) and visual information (e.g. the graphical display and windows).

In accordance with an embodiment of the invention, the use of the proxy server 110 can be beneficial, in terms of alleviating the life-cycle burden in maintaining different versions of the same software on a large number of servers, devices, and platforms, since the proxy server 110 does not rely on the agent 121 that is deployed physically on a target system 111.

On the other hand, the agent 121 and the proxy server 110 can monitor said one or more user sessions on the target system simultaneously. As shown in FIG. 1, the agent 121 can be deployed on a sensitive system (e.g. the target system 111), which is also monitored by the proxy server 110. Since the agent 121 is physically deployed on the target system 111, the agent 121 can closely monitor the different user actives and collect more information than the proxy server 110.

Then, an administrator 130 can connect to the privileged account manager 101 and perform various management tasks, such as view, search and audit the recorded sessions, in order to prevent inappropriate access to various account and to detect unauthorized activities.

Figure 2:
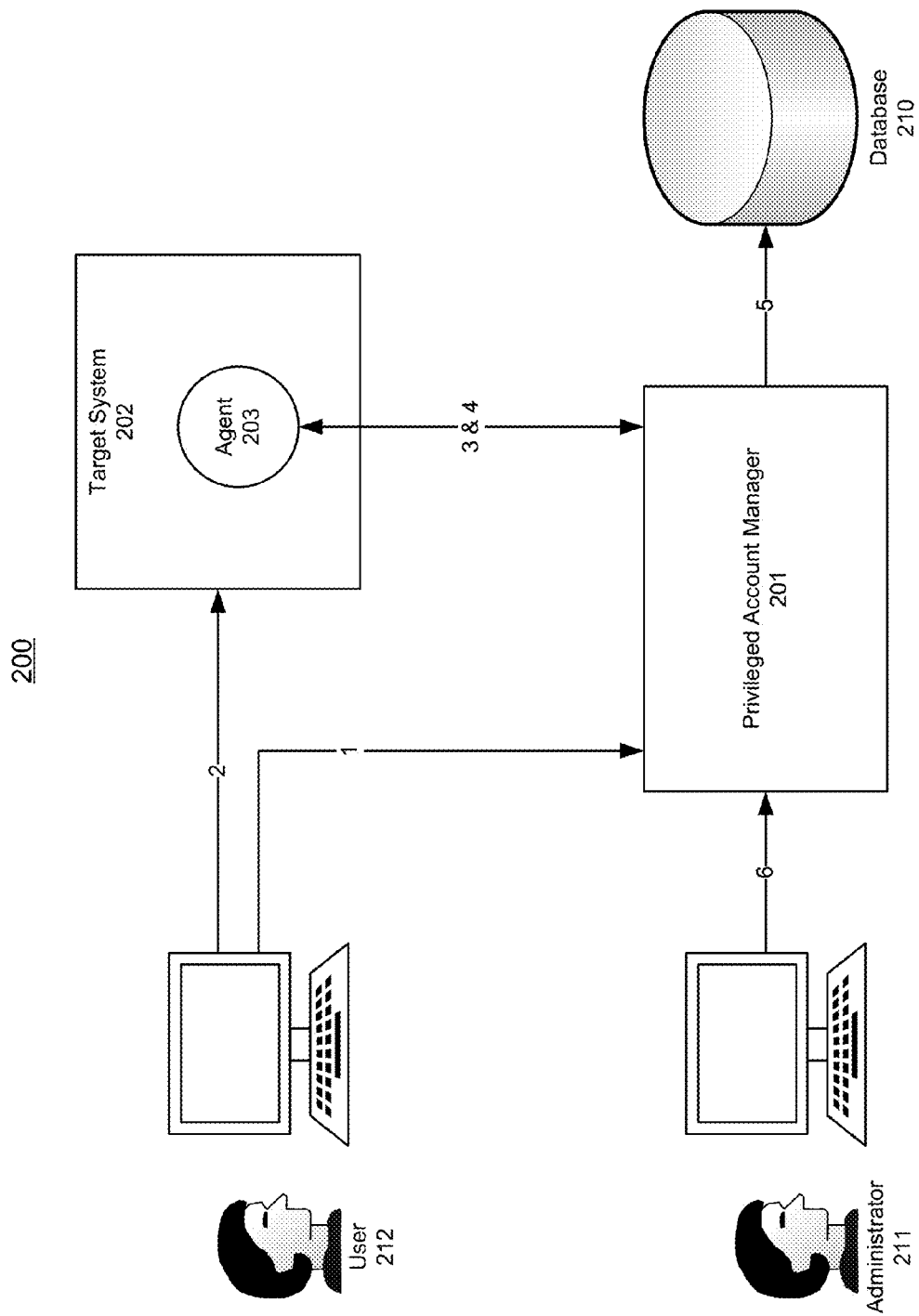
FIG. 2 shows an illustration of supporting user session monitoring in a computing environment, in accordance with an embodiment of the invention.

FIG. 2 shows an illustration of supporting user session monitoring in a computing environment, in accordance with an embodiment of the invention. As shown in FIG. 2, a privileged account manager 201, e.g. an Oracle the Oracle Privileged Account Manager (OPAM), can be used for monitoring user sessions on a target system 202.

At step 1, a user 212 can connect to the privileged account manager 201 (i.e. the server) and can send a request to the privileged account manager 201 for obtaining an access to a privileged account on the target system 202.

Upon receiving a request for accessing a privileged account from the user 201, the privileged account manager 201 can provide the user 212 with a password or a session. Then, the user 212 can access the privileged account based on the received one-time passwords or direct sessions. For example, the user 212 can obtain a session with graphical interface.

At step 2, the user 212 can connect to the target system 202 to establish a session after obtaining access to the privileged account. A user session may start as soon as a user 212 logs into the privileged account on the target system 202, using the password or session provided by the privileged account manager 201.

Additionally, the access to the privileged account may not be available after the user 212 logs out from the privileged account on the target system 202. The user session may end as soon as the user 212 logs out from the privileged account, at which time the user 212 relinquish its right to access the privileged account and another user is allowed to log in the privileged account.

At step 3, the agent 203 running on the target system 202, after detecting the establishment of a user session, can communicate with privileged account manager 201 to obtain different policies or configurations, such as the screen comparison rules.

The agent 203 can capture and record various screens on the target system 202 based on the screen comparison rules.

At step 4, the agent 203 can send the recorded data back to the privileged account manager 201 for storage.

At step 5, the privileged account manager 201 can store the recorded data in a database 210. For example, the database 210 can be an OPAM Database, which can be used for storing target information, user grants, policies and session recording data.

At step 6, the administrator 211 can connect to the privileged account manager 201 in order to view the recorded and/or ongoing sessions. The administrator 211 can review the recorded sessions, which are the completed user sessions after the user has already logged off. Also, the administrator 211 can review an ongoing session when a user is still using the session. In the case of reviewing an ongoing session, the administrator 211 may view the recording (in real time) as the session is ongoing in a fashion similar to a live record-replay (a.k.a. over the shoulder monitoring).

Visual Session Recording

Figure 3:
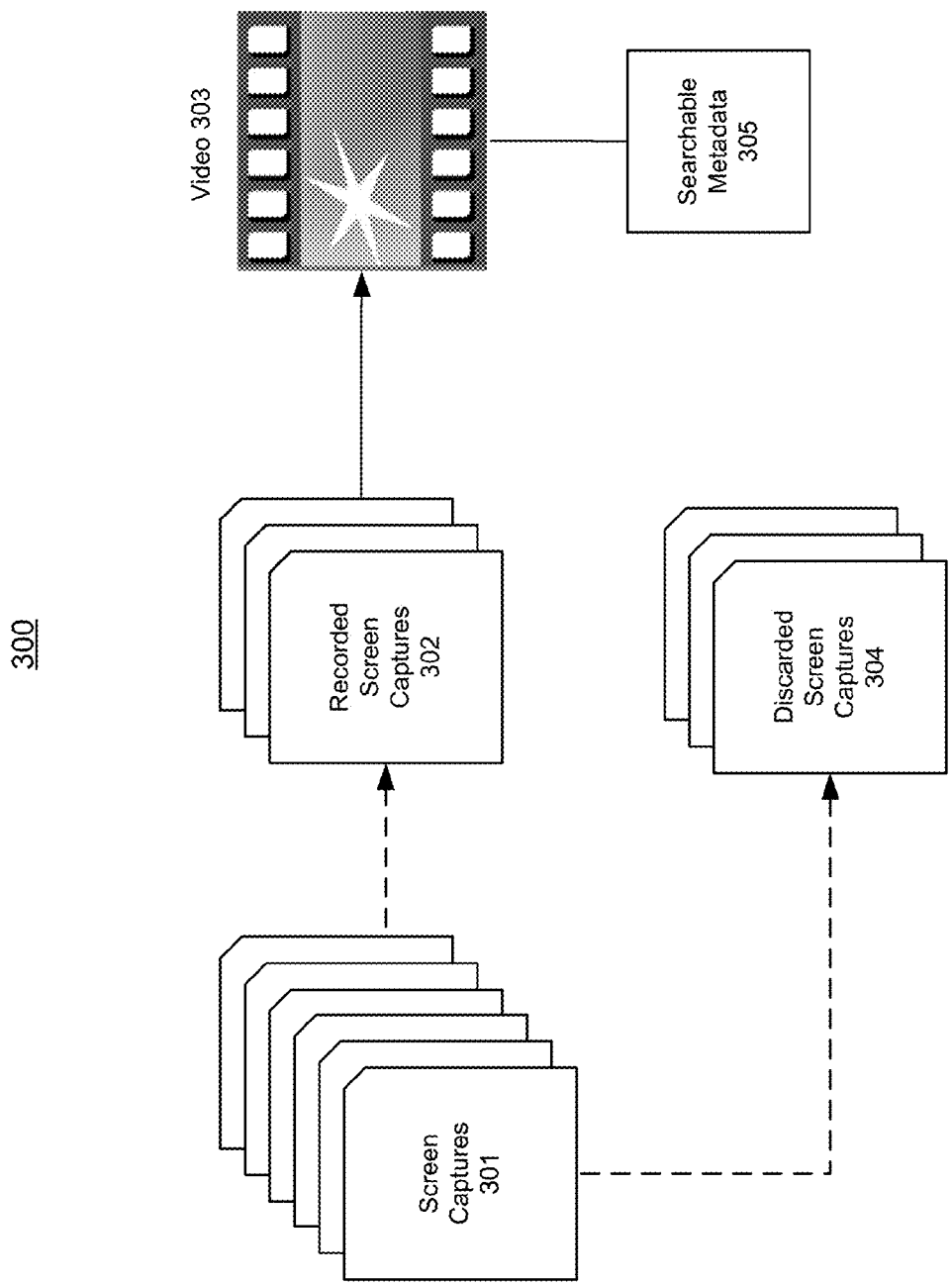
FIG. 3 shows an illustration of supporting visual session recording in a computing environment, in accordance with an embodiment of the invention.

FIG. 3 shows an illustration of supporting visual session recording in a computing environment, in accordance with an embodiment of the invention. As shown in FIG. 3, an account management system 300 can capture a number of screen captures 301 (e.g. screen shots or snapshots) on a target system, e.g. using an agent on the target system or a proxy server, during a user session.

In accordance with an embodiment of the invention, the account management system 300 can record a subset of the screen captures 301, which includes only screen captures 302 that represent significant changes during the user session, discarding the screen captures 304 that are captured when the target system is considered idle.

Thus, the account management system 300 can optimize the usage of processors, storage and network bandwidth.

Furthermore, the account management system 300 can encode the screen captures 302, which are recorded and uncompressed images, into a video 303 and stores the video 303 in a database, such as the OPAM database. The video 303 can be played back later in a fashion similar to a DVR.

Additionally, searchable textual metadata 305, which includes information about the activities, can also be recorded and provided along with the video 303. Thus, an administrator of the account management system 300 can search through the collection of recordings (e.g. the video 303) to look for activities, such as sessions which ran Internet Explorer, Control Panel etc. This provides means to monitor, audit and perform forensic analysis on the target system.

Dynamically Offloading a Video Processing Task

Figure 4:
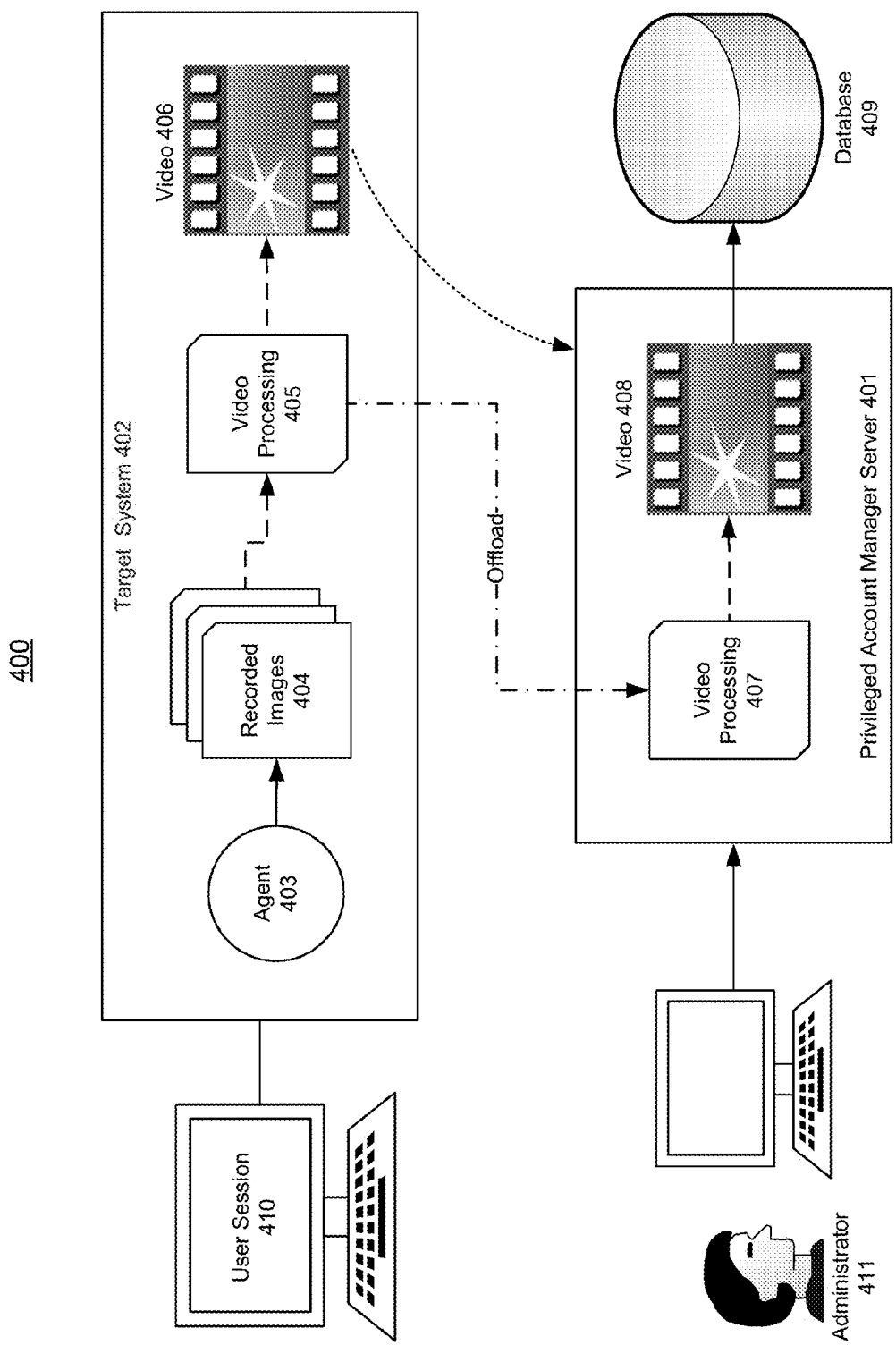
FIG. 4 shows an illustration of dynamically offloading a video processing task in a computing environment, in accordance with an embodiment of the invention.

FIG. 4 shows an illustration of dynamically offloading a video processing task in a computing environment, in accordance with an embodiment of the invention. As shown in FIG. 4, a managing server, e.g. a privileged account manager server 401, can use an agent 403 for managing a target system 402 in a computing environment 400.

In accordance with an embodiment of the invention, the agent 403 (such as an OPAM agent) running on the target system 402 can record various actions in a user session 410 (e.g. a user logon-session). As shown in FIG. 4, the agent 403 can periodically capture and record a number of screen captures, such as the recorded and uncompressed images 404.

Furthermore, the user session recording mechanism, such as the OPAM windows session recording system, involves processing the recorded and uncompressed images 404 and creating (or encoding) a video 406 for DVR like play back.

As shown in FIG. 4, the agent 403 can initiate a video processing task 405 (such as a video encoding task using a suitable video codec) on the target system 402, which encodes the recorded and uncompressed images 404 into a video 406 (using a suitable video codec). Additionally, the video 406 can be augmented with textual (and other forms of) metadata, which can be used for searching specific patterns in the video 406 and for combining various video segments.

After creating the video 406, the agent 403 can transmit the video 406 to the privileged account manager server 401 (such as an OPAM Server). Then, the privileged account manager server 401 can store the video 406 in a database 409 for distribution (e.g. allows an administrator 411 to review the user session 410 in a DVR like fashion).

The video processing task 405 on the target system 402 can be a processor intensive operation that places a heavy load on the CPU and the GPU (if available). Furthermore, the video encoding task 405 may consume a large amount of the memory, such as a random access memory (RAM), on the target system 402. Thus, the video encoding task 405 may potentially downgrade the system performance of the target system 402 in a resource-constrained environment, where the video encoding 405 task competes with other processes for resources, such as the CPU and the memory.

In accordance with an embodiment of the invention, the video processing task 405 can be offloaded to the privileged account manager server 401 (e.g. the OPAM server system), instead of being performed on the target system 402 (e.g. the windows session being recorded).

By delegating the video processing task 405 to the privileged account manager server 401, the target system 402 can reduce the resource usage for performing the video processing task 405 on the target system 402. On the other hand, the target system 402 may need to transmit the recorded and uncompressed images 404 to the privileged account manager server 401, which may potentially increase the consumption of the network bandwidth.

In accordance with an embodiment of the invention, in order to optimize the system performance, the dynamic offloading of the video processing task 405 from the target system 402 to the privileged account manager server 401 can be based on configurable thresholds, which controls the resource usage on the target system 402.

For example, the video processing task 405 can be dynamic offloaded from the target system 402 to the privileged account manager server 401, if the video processing 405 on the target system 402 exceeds a pre-defined CPU and memory usage threshold over a duration (or a period). Such scenario may happen during peak periods, when a large number of windows activities are performed (which leads to a significant increase in video processing load).

In accordance with an embodiment of the invention, there are different approaches for estimating and modeling the video processing 405 load. For example, an OPAM Agent process on the managed end system (i.e. a node) can track the CPU and memory utilization by maintaining a continuous moving average window.

Additionally, the thresholds and durations can be defined for controlling the resource usage on the target system 402. For example, the thresholds (or limits) for the CPU and memory usage, which are unique to each node, can be pre-calculated according to the hardware capability of the underlying node, during the system boot-up. Thus, the target system 402 can decide whether to offload the encoding task elsewhere at runtime.

Furthermore, the privileged account manager server 401 can resume the performing of the video processing task 407 and create the video 408, after the recorded and uncompressed images 404 are transmitted over the network to the privileged account manager server 401. Then, the privileged account manager server 401 can store the video 408 in a database 409 for distribution (e.g. allows an administrator 411 to review the user session 410 in a DVR like fashion along with the video 406).

In accordance with an embodiment of the invention, the video processing task 407 can be switched back to the target system 402, when the volume of the receiving data (including the recorded and uncompressed images 404 transmitted from the target system 402) is observed being reduced to a low level (e.g. a level lower than the level when the offloading starts).

For example, the switch back of the video processing task 407 can happen after the peak period has passed, and the session recording can be resumed with lower CPU usage on the target system 402.

Figure 5:
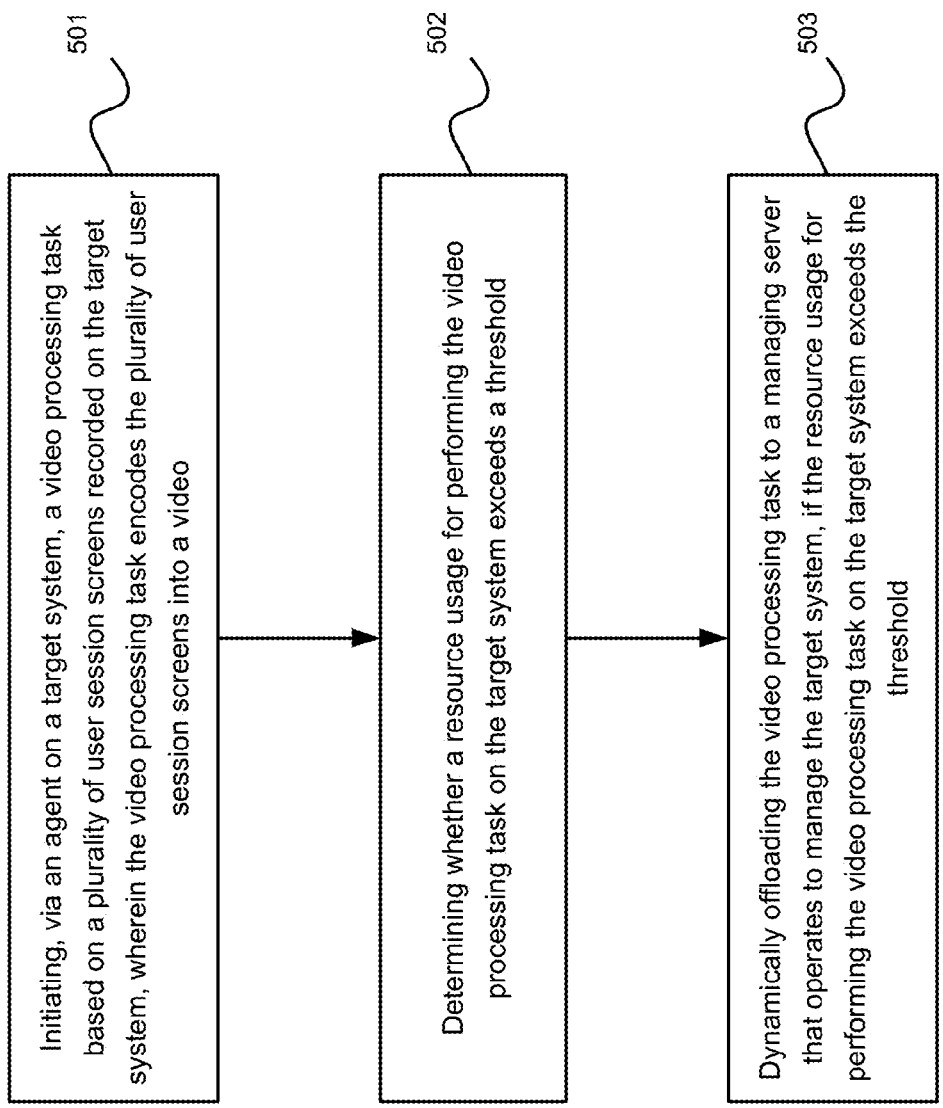
FIG. 5 illustrates an exemplary flow chart for dynamically offloading a video processing task in a computing environment, in accordance with an embodiment of the invention.

FIG. 5 illustrates an exemplary flow chart for dynamically offloading a video processing task in a computing environment, in accordance with an embodiment of the invention. As shown in FIG. 5, at step 501, an agent on a target system can initiate a video processing task based on a plurality of user session screens recorded on the target system, wherein the video processing task encodes the plurality of user session screens into a video. Furthermore, at step 502, the agent can determine whether a resource usage for performing the video processing task on the target system exceeds a threshold. Then, at step 503, the agent can dynamically offload the video processing task to a managing server that operates to manage the target system, if the resource usage for performing the video processing task on the target system exceeds the threshold.

Intelligent Load-Balancing Using a Video Encoding Pool

Figure 6:
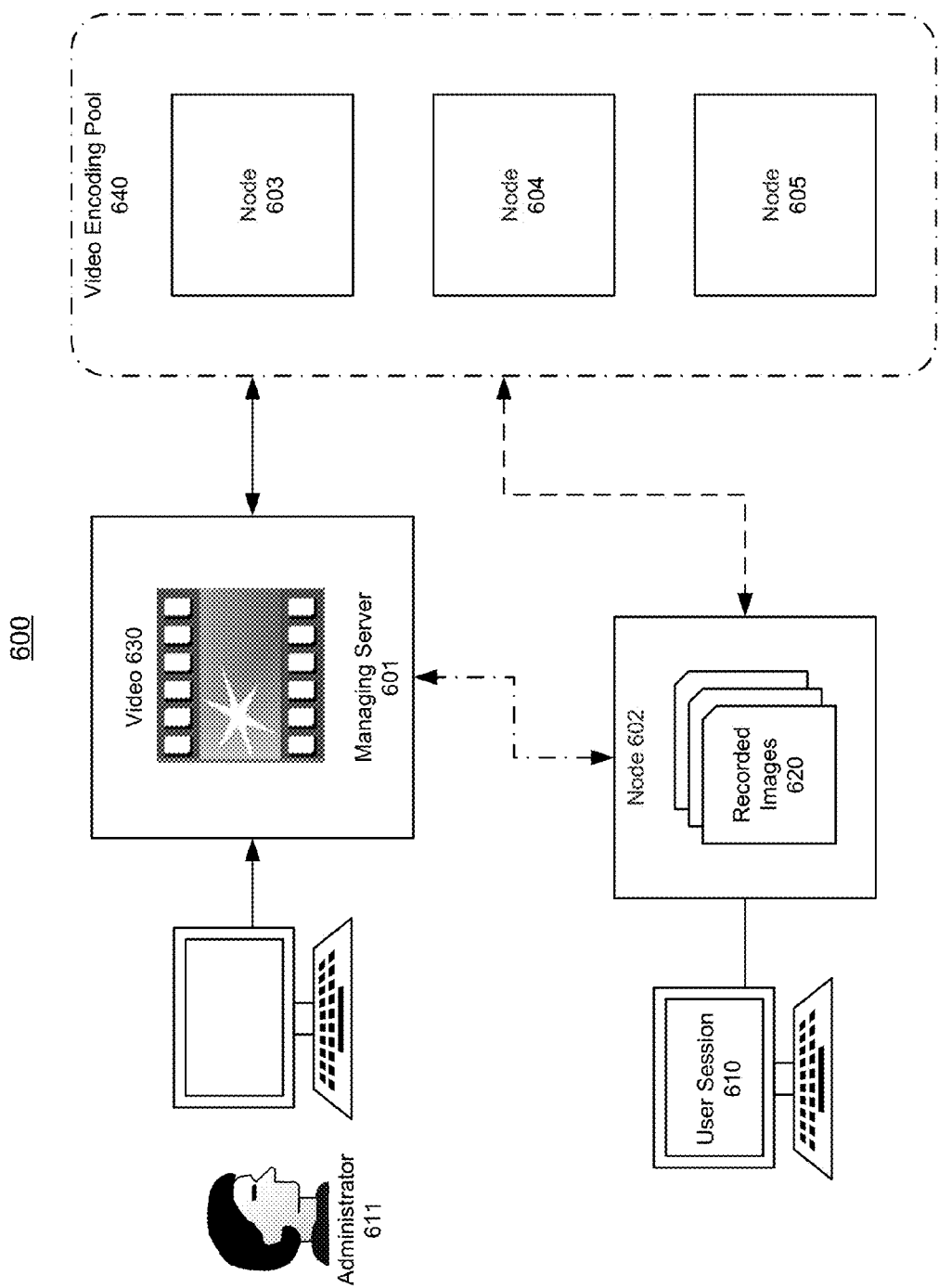
FIG. 6 shows an illustration of using a video processing pool to support load-balancing in a computing environment, in accordance with an embodiment of the invention.

FIG. 6 shows an illustration of using a video processing pool to support load-balancing in a computing environment, in accordance with an embodiment of the invention. As shown in FIG. 6, a managing server 601, e.g. a privileged account manager server under the control of an administrator 611, can manage one or more nodes, such as the nodes 602-605 in a computing environment 600.

In accordance with an embodiment of the invention, the managing server 601 can intelligently balance the load for performing the video processing tasks (e.g. the video encoding tasks), by distributing the video encoding tasks among the managing server 601 and the managed nodes 602-605.

As shown in FIG. 6, the managing server 601 can take advantage of a video encoding pool 640. The video encoding pool 640 contains a set of nodes 603-605, each of which can be delegated by the managing server 601 to perform the video encoding tasks for another node (e.g. the node 602).

Furthermore, the dynamically-managed video encoding pool 640 can be configurable. For example, an administrator 611 can configure the nodes 603-605 to be eligible for the video encoding pool 640.

Additionally, the nodes 603-605 in the video encoding pool 640 can possess hardware capability beneficial to video encoding. For example, the nodes 603-605 in the video encoding pool 640 may have an on-board graphics processing unit (GPU) and/or a high clock-speed CPU, and may have a large capacity RAM with L2/L3 caches.

On the other hand, critical nodes (such as databases and web-servers), which perform critical tasks, may be excluded from the video encoding pool 640. Thus, the system can prevent these critical nodes from becoming resource constrained when the video encoding tasks are performed.

In accordance with an embodiment of the invention, different approaches can be used for estimating and modeling the load on a node. For example, an OPAM Agent process on the managed end system can track the CPU and memory utilization by maintaining a continuous moving average. A threshold (or a limit) can be used by the node to decide whether to offload the encoding task to another node in the managed system. Additionally, the thresholds for the CPU and memory usage, which are unique to each node, can be pre-calculated during the system boot-up, according to the hardware capability of the node.

Furthermore, a multi-level model can be used to characterize the load on each node. For example, a three-level model can be employed to include a high load state, a normal load state and a below-normal load state (e.g. based on the run-time CPU and memory usage estimations). Also, the run-time CPU and memory usage can be estimated using a confidence interval. For example, the three-level model can be based on a confidence interval, which is constructed using a specific confidence level, such as a pre-configured value (e.g. at 95% accuracy).

In accordance with an embodiment of the invention, when the estimated load on the node 602 is in the high load state, the node 602 may decide to offload the video encoding task elsewhere. On the other hand, a node in the video encoding pool 640 may be able to accept a task from another node, only when the load on the node is in the below-normal state.

In accordance with an embodiment of the invention, the managing server 601 can take advantage of an intelligent load-balancing algorithm, which supports a centralized dynamic load balancing scheme.

As shown in FIG. 6, the managing server 601, which acts as the master node, can perform various pool management tasks, such as keeping track of the node resources (i.e. CPU and memory utilization), providing admission control of the nodes to the pool, performing the allocation of encoding tasks to specific nodes, tracking the encoding tasks on the nodes and handling node failures. Thus, the managing server 601 can optimize the resource usage, including the usage of CPU, memory and network bandwidth.

Additionally, the managing server 601 can be enabled with the high availability (HA)/replication features, which may serve as a guard against the single point of failure that affects the centrally managed load balancing scheme.

In accordance with an embodiment of the invention, each of the nodes 603-605 in the video encoding pool 640 can monitor their CPU and memory usage and periodically estimates the corresponding values (e.g. based on the confidence interval). Furthermore, the nodes 603-605 in the encoding pool 640 can send information about their resource utilization (such as the CPU, GPU and memory usage) to the managing server 601. In order to reduce the state-exchange overhead, such information can be sent only when a state change (with regard to the resource utilization) occurs in the node.

Additionally, the managing server 601 can maintain a record for each node, which indicates its resource usage. Also, the managing server 601 can maintain the topology information for the geographic distribution of the nodes 602-605.

As shown in FIG. 6, when a managed node 602 (i.e. a targeted system) becomes resource constrained (e.g. when the node 602 is in a high load state), the managed node 602 may decide to offload the encoding task. In such a case, the managed node 602 can send a message to the managing server 601, requesting for delegating the video encoding task to other available node(s).

The managing server 601 can select a set of nodes, which are the most appropriate candidates for performing the encoding task, from the video encoding pool 640. This algorithm can be based on different load-transfer policies, such as a threshold-based policy or a shortest route/time policy. Additionally, the selected node set can be optimized based on the geographic distribution of the nodes such that the node set is selected to be as locally as possible.

In accordance with an embodiment of the invention, the task scheduling algorithm may prefer to move the video encoding tasks away from the managing server 601. For example, in OPAM, the managed nodes 603-605 may be given a higher priority, over the managing server 601, for accepting tasks that are delegated to run on the OPAM Server.

The intelligent load balancing algorithm can be beneficial for efficiently performing various video processing tasks, when there are actually nodes in the video encoding pool 640. Otherwise, the video encoding tasks may be executed only on the respective managed nodes or the managing server 601, when there are no suitable nodes in the video encoding pool 640.

For example, if the managing server 601 cannot find any suitable node from the video encoding pool 640, the managing server 601 can become the encoding node itself (until it finds a proxy node). In such a case, the source node 602 can send the recorded and uncompressed images 620 in a user session 610 to the managing server 601 and expects to receive an ACK message for every N frames of recorded and uncompressed images 620 being sent. The source node 602 may also maintain the N frames of recorded and uncompressed images 620 in a local cache, which is cleared upon receiving the ACK from the managing server 601.

The managing server 601 can re-initiate the search for a proxy node periodically (or upon receiving the state-change messages from the pool), so that it can offload the video encoding to the video encoding pool 640. It continues offloading the encoding task until no new node can be found.

Furthermore, the originating source node 602, which may act as the encoding node, can move into a high load state. During a search, the managing server 601 may be able to find a number (M) of suitable proxy nodes in the video encoding pool 640. Thus, the recorded and uncompressed images 620 may be distributed to different numbers (e.g. [1 ... M]) of proxy nodes, depending on the input frame rate, K. For example, if the input frame rate, K, is larger than or equal to the number of available suitable proxy nodes, M, (i.e. K>=M), then the resource constrained node may not split the load further and can send the load to one of the new proxy nodes. Otherwise, if the input frame rate, K, is less than the number of available suitable proxy nodes, M, (i.e. K<M), the load can be split among the M nodes.

In accordance with an embodiment of the invention, the managing server 601 can stitch the sequence of video segments together. In OPAM, the proxy nodes 603-605 can send metadata information, which may be used by the OPAM Server to construct the final video 630, along with the encoded video segments.

Additionally, the managing server 601 can handle node and link failures, such as when the proxy encoding node fails, or when the link between the source node and any proxy node or the link between the managing server 601 and a proxy node fails.

Figure 7:
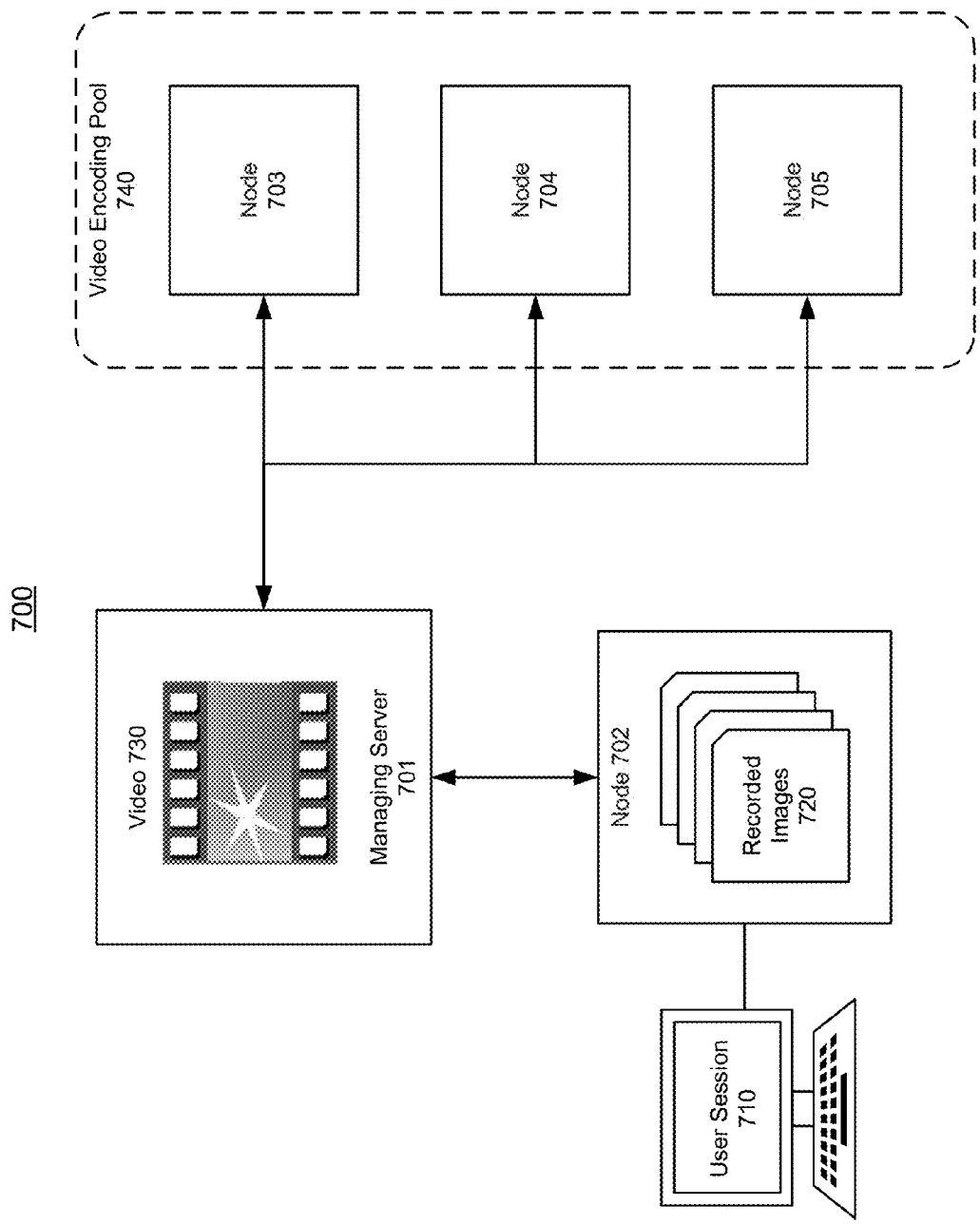
FIG. 7 shows an illustration of supporting load balancing via a hub in a computing environment, in accordance with an embodiment of the invention.

FIG. 7 shows an illustration of supporting load balancing via a hub in a computing environment, in accordance with an embodiment of the invention. As shown in FIG. 7, a managing server 701, e.g. a privileged account manager server, can manage one or more nodes, such as the nodes 702-705 of a video encoding pool 740 in a computing environment 700.

In accordance with an embodiment of the invention, the managing server 701 can act as a hub for content traffic, when a security policy in the computing environment 700 prevents the managed nodes 702-705 from communicating directly with each other.

As shown in FIG. 7, the source node 702 can communicate with the managing server 701 and delegates the video encoding task to the managing server 701. Then, the source node 702 can stop performing the video encoding task and starts sending the recorded and uncompressed images 720 (i.e. the un-encoded screen captures in a user session 710) to the managing server 701.

In accordance with an embodiment of the invention, the managing server 701 can select one or more nodes 703-705 from the video encoding pool 740 as proxies for performing the video encoding task.

For example, if the managing server 701 finds a number (e.g. M) of proxy nodes in the video encoding pool 740, the managing server 701 can split the incoming stream from the originating node 702 and can send the recorded and uncompressed images 720 to these (M) proxy nodes, in a static round-robin load balancing fashion. Thus, each of the M proxy nodes may receive a frame every M time units, periodically (with each time unit separates two consecutive incoming frames).

Furthermore, the proxy nodes 703-705 can send an acknowledgment (ACK) to the managing server 701 for confirming the receiving of the set of images. The managing server 701 can maintain, in a local cache, copies of the recorded and uncompressed images 720 that are sent to the proxy nodes 703-705. Then, the local cache on the managing server 701 can be cleared upon receiving the ACK message from the respective proxy encoding nodes 703-705.

Thus, each proxy node can progressively encode the received images into a sequence of video segments, which are sent back to the managing server 701 separately. Then, the managing server 701 can construct the full-video 730 by concatenating the video segments sequence together using the video metadata information.

Additionally, when the managing server 701 acts as a hub, the managing server 701 can detect the failure of a node or a link by monitoring the timeout of the ACK that should be received from the different participant proxy nodes.

When a failure happens, the managing server 701 can send a message to the source node 702 to inspect if the source node 702 can perform the sub-task for the failed proxy node. If the source node 702 cannot perform the (sub-)task for the failed proxy node, the source node 702 sends a message to the managing server 701 requesting for another proxy. Then, the managing server 701 can repeat the above process until a new proxy node is found.

Figure 8:
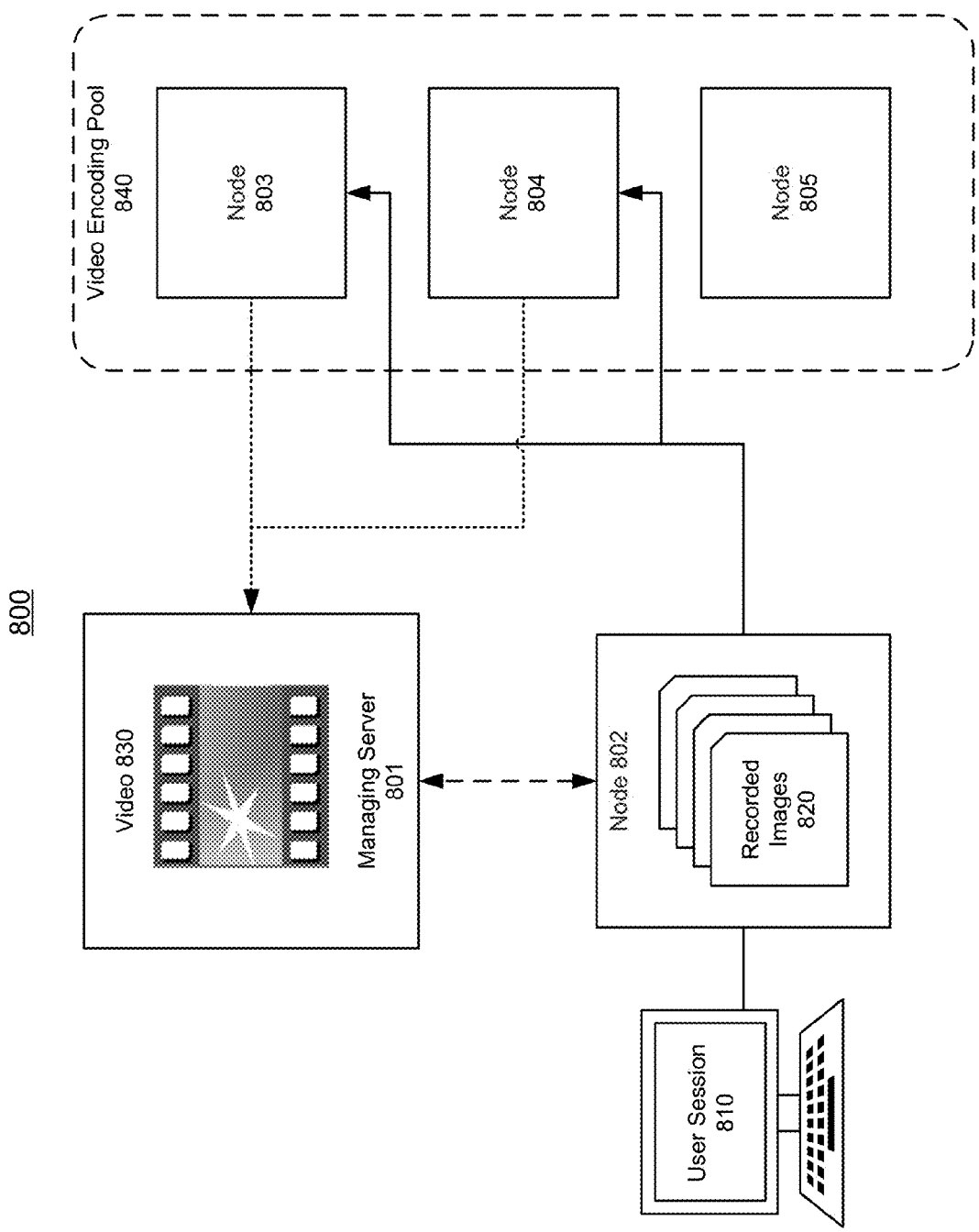
FIG. 8 shows an illustration of supporting load balancing with direct inter-node communication in a computing environment, in accordance with an embodiment of the invention.

FIG. 8 shows an illustration of supporting load balancing with direct inter-node communication in a computing environment, in accordance with an embodiment of the invention. As shown in FIG. 8, a managing server 801, e.g. a privileged account manager server, can manage one or more managed nodes, such as the nodes 802-805 of a video encoding pool 840 in a computing environment 800.

In accordance with an embodiment of the invention, the managing server 801 can coordinate the distributing of the video encoding load, when the security policy allows direct inter-node communication between the various managed nodes 802-805. For example, the managing server 801 can send a message, which indicates the selected proxy nodes 803-804 in the video encoding pool 820, to the originating node 802.

Then, the originating node 802 can send the recorded and uncompressed images 820 in a user session 810 to the proxy nodes 803-804 directly, using a static round-robin load balancing fashion. Thus, each selected proxy node 803-804 can receive a frame from the originating node 802 periodically (e.g. one frame every M time units when there are totally M selected proxy nodes).

Furthermore, each proxy nodes 803-804 can send an acknowledgement (ACK) message to the originating source node 802, for confirming the receipt of the set of images. Additionally, the source node 802 can maintain, in a local cache, copies of the images that are sent to the proxy nodes 803-804. Accordingly, the cache can be cleared upon receiving the ACK message from the respective proxy encoding nodes 803-804.

Then, each selected proxy node 803-804 can progressively encode the received images into a sequence of video segments, which are sent to the managing server 801 directly. Then, the managing server 801 can construct the full-video 830 by concatenating this video sequence together.

Additionally, the source node 802 can detect a failure on a node (or a link) by monitoring the timeout of the ACK that should be received from the proxy encoding nodes 803-804.

The source node 802 can inspect its own resource usage to determine whether it can perform the video processing task for a failed proxy node, since the source node 802 can communicate directly with the proxy nodes 803-804. If the source node 802 cannot perform the sub-task from the failed proxy node, the source node 802 can send a message to the managing server 801, requesting for another proxy node.

The managing server 801 can repeat the process until it successfully finds a proxy node (e.g. node 805).

Figure 9:
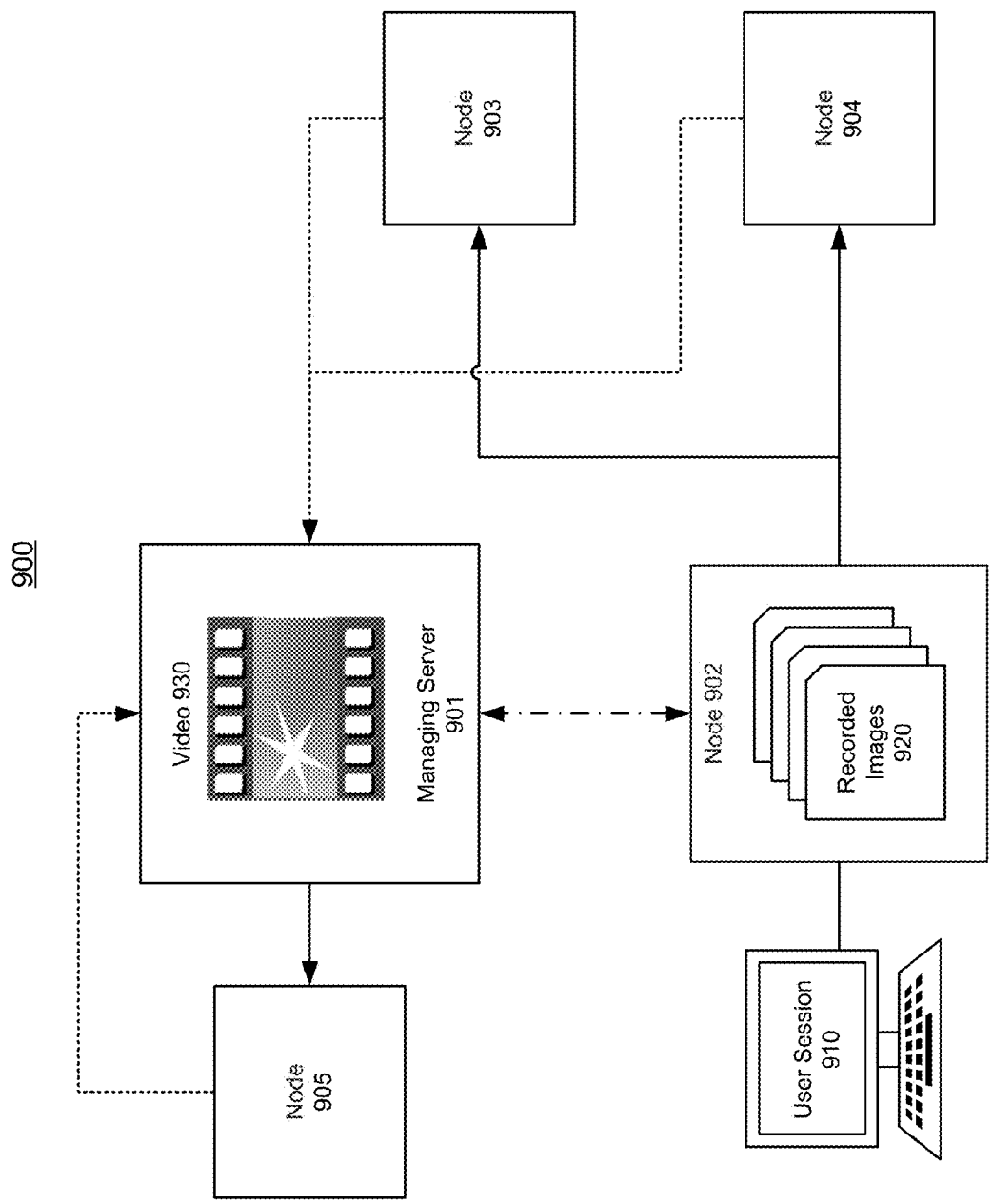
FIG. 9 shows an illustration of using a hybrid model to perform a video processing task in a computing environment, in accordance with an embodiment of the invention.

FIG. 9 shows an illustration of using a hybrid model to perform a video processing task in a computing environment, in accordance with an embodiment of the invention. As shown in FIG. 9, a managing server 901, e.g. a privileged account manager server, can manage one or more nodes, such as the nodes 902-905 in a computing environment 900.

In accordance with an embodiment of the invention, a hybrid approach can be used for performing the video processing task, when a security policy in the computing environment 900 allows only partial communication between the various managed nodes 902-905.

For example, if the originating source node 902 is allowed to communicate with a number (L) of nodes out of the number (M) of nodes, the originating source node 902 can send the frames directly to each of the number (L) of nodes in the round-robin fashion. Additionally, the originating source node 902 can send the remaining traffic to the number (M-L) of nodes via the managing server 901, which acts as the hub.

As shown in FIG. 9, if the originating source node 902 is allowed to communicate with the nodes 903-904, the originating source node 902 can send the frames directly to the nodes 903-904 in the round-robin fashion. Additionally, the originating source node 902 can send the remaining traffic to the node 905 through the managing server 901, which acts as the hub.

Furthermore, each proxy node 903-905 can progressively encode the received images into a sequence of video segments, which are sent back to the managing server 901 separately. Then, the managing server 901 can construct the full-video 930 by concatenating the video sequence together.

Additionally, the source node 902 can detect a failure on a node or a link by monitoring the timeout of the ACK that should be received from each proxy node. For example, the source node 902 can receive an ACK message directly from the nodes 903-904, and can receive an ACK message from the node 905 via the managing server 901.

Figure 10:
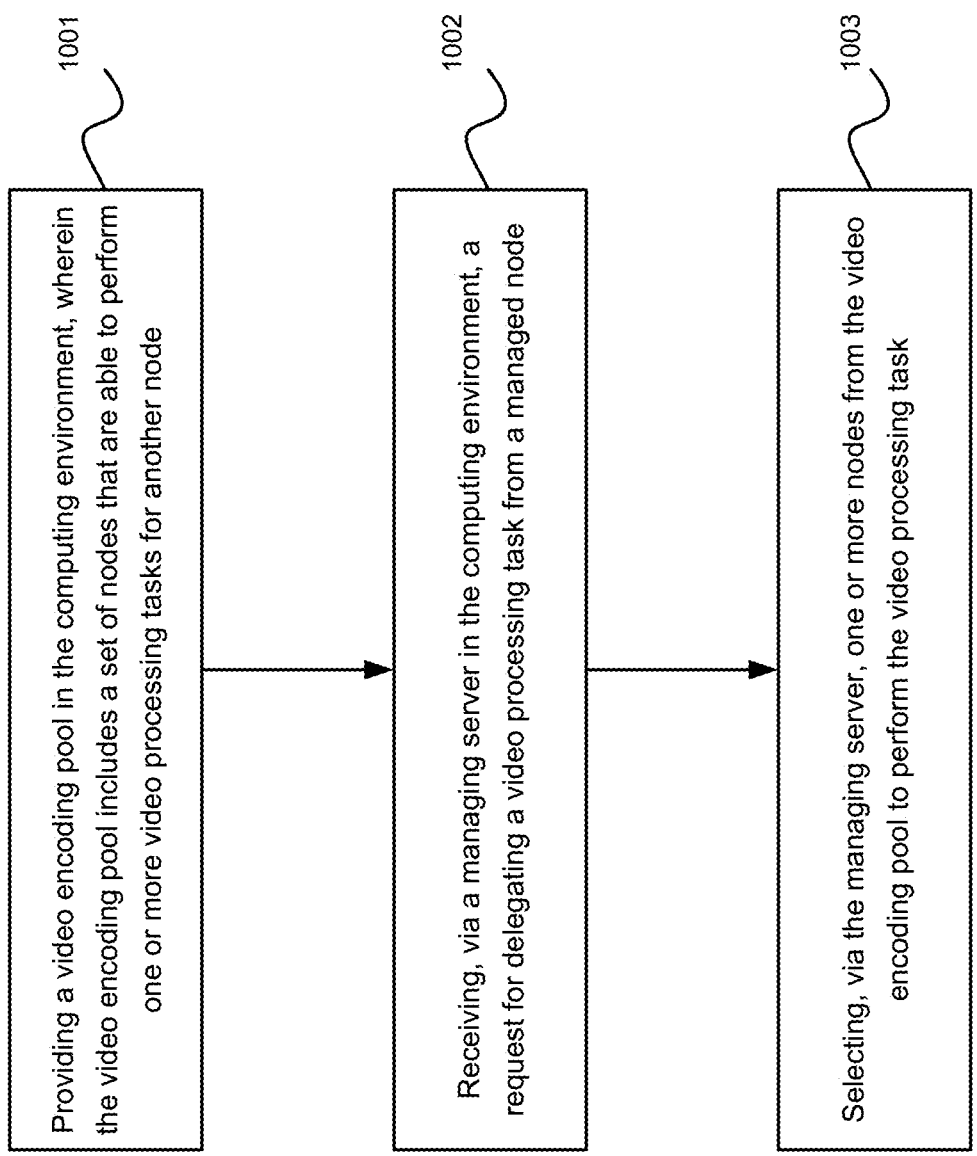
FIG. 10 illustrates an exemplary flow chart for using a video processing pool to support load-balancing in a computing environment.

FIG. 10 illustrates an exemplary flow chart for using a video processing pool to support load-balancing in a computing environment. As shown in FIG. 10, at step 1001, the system can provide a video encoding pool in the computing environment, wherein the video encoding pool includes a set of nodes that are able to perform one or more video processing tasks for another node. Furthermore, at step 1002, a managing server in the computing environment can receive a request for delegating a video processing task from a managed node. Then, at step 1003, the managing server can select one or more nodes from the video encoding pool to perform the video processing task.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting video processing load balancing for user account management in a computing environment, the method comprising:
   providing a video encoding pool in the computing environment, wherein the video encoding pool comprises a set of nodes that are able to perform one or more video processing tasks for another node;
   receiving, by a managing server in the computing environment, a request for delegating a video processing task from a managed node;
   selecting, by the managing server, one or more nodes from the video encoding pool to perform the video processing task;
   coordinating, by the managing server, a distributing of the video processing task directly between the managed node and the one or more selected nodes of the video encoding pool if the managed node is permitted to communicate directly with the one or more selected nodes by:
      operating the managing server to indicate to the managed node the one or more selected nodes of the video encoding pool as one or more video processing task proxy nodes of the video encoding pool; and
   responsive to the managing server indicating the one or more video processing task proxy nodes, operating the managed node to distribute a plurality of user session screens as the video processing task to the one or more video processing task proxy nodes of the video encoding pool.

2. The method according to claim 1, further comprising:
   providing, by the managing server, privileged account manager management.

3. The method according to claim 1, further comprising:
   establishing a user session by:
      providing a connection to a privileged account manager server, and
      grantinq access to a privileged account on the managed node.

4. The method according to claim 1, further comprising:
   receiving, by the managing server, resource usage information from each node in the video encoding pool, and
   maintaining, by the managing server, a record for each node in the video encoding pool.

5. The method according to claim 1, further comprising:
   detecting an establishment of a user session on the managed node.

6. The method according to claim 5, further comprising:
capturing a plurality of user session screens associated with said user session on the managed node at a predetermined interval.

7. The method according to claim 1, further comprising:
receiving, by the managing server, a request for delegating a video processing task from another managed node, where said another managed node is a node in the video encoding pool.

8. The method according to claim 1, further comprising:
maintaining, by the managed node in a local cache of the managed node, copies of the plurality of user session screens distributed by the managed node directly to the one or more video processing task proxy nodes,
wherein the managed node is operative to selectively clear from the cache a copy of a first user session screen responsive to receiving from the one or more video processing task proxy nodes an acknowledgement (ACK) of receipt by the one or more video processing task proxy nodes of the first user session screen.

9. The method according to claim 1, further comprising:
receiving, by the managing server, one or more videos from the one or more selected nodes, after the video processing task is performed.

10. The method according to claim 9, further comprising:
associating the one or more videos with a searchable metadata.

11. The method according to claim 1, further comprising:
performing, by the managing server, the video processing task if the managing server is not able to find a suitable node in the video encoding pool.

12. The method according to claim 1, further comprising:
using a hybrid approach to perform the video processing task.

13. The method according to claim 1, further comprising:
stitching, by the managing server, a sequence of videos together into a video.

14. The method according to claim 1, further comprising:
storing, by the managing server, a video, which results from performing the video processing task for one or more user sessions, to a database.

15. The method according to claim 14, further comprising:
monitoring said one or more user sessions by replaying the video stored in the database.

16. A system for supporting video processing load balancing for user account management in a computing environment, the system comprising:
one or more microprocessors;
a video encoding pool in the computing environment, wherein the video encoding pool comprises a set of nodes that are able to perform one or more video processing tasks for another node;
a managing server running on said one or more microprocessors, the managing server operating to:
receive, from a managed node, a request for delegating a video processing task;
select one or more nodes from the video encoding pool to perform the video processing task; and
coordinate a distributing of the video processing task directly between the managed node and the one or more selected nodes of the video encoding pool if the managed node is permitted to communicate directly with the one or more selected nodes by indicating to the managed node the one or more selected nodes of the video encoding pool as one or more video processing task proxy nodes of the video encoding pool; and
responsive to the managing server indicating the one or more video processing task proxy nodes, operating the managed node to distribute a plurality of user session screens as the video processing task to the one or more video processing task proxy nodes of the video encoding pool.

17. The system according to claim 16, wherein:
the managing server is a privileged account manager server.

18. The system according to claim 17, wherein:
the system is operable to establish a user session by:
establishing a connection to the privileged account manager server, and
granting access to a privileged account on the managed node.

19. The system according to claim 16, wherein:
the managing server operates to
receive resource usage information from each node in the video encoding pool, and
maintain a record for each node in the video encoding pool.

20. The system according to claim 16, wherein:
the managing server operates to detect an establishment of a user session on the managed node.

21. The system according to claim 20, wherein:
a plurality of user session screens associated with said user session are captured on the managed node at a predetermined interval.

22. The system according to claim 16, wherein:
the managing server operates to receive a request for delegating a video processing task from another managed node, where said another managed node is a node in the video encoding pool.

23. The system according to claim 16, wherein:
the managed node operates to maintain in a local cache of the managed node copies of the plurality of user session screens distributed by the managed node directly to the one or more video processing task proxy nodes,
wherein the managed node is operative to selectively clear from the cache a copy of a first user session screen responsive to receiving from the one or more video processing task proxy nodes an acknowledgement (ACK) of receipt by the one or more video processing task proxy nodes of the first user session screen.

24. The system according to claim 16, wherein:
the managed node operates to receive one or more videos from the one or more selected nodes, after the video processing task is performed.

25. The system according to claim 24, wherein: the managed node operates to associate the one or more videos with a searchable metadata.

26. The system according to claim 16, wherein:
the managed node operates to selectively perform the video processing task if the managing server is not able to find a suitable node in the video encoding pool.

27. The system according to claim 16, wherein:
a hybrid approach is used to perform the video processing task.

28. The system according to claim 16, wherein:
the managed node operates to stitch a sequence of videos together into a video.

29. The system according to claim 16, wherein:
the managing server operates to store the video to a database; and the managing server operates to replay the stored video for monitoring said one or more user sessions.

30. A non-transitory machine readable storage medium having instructions stored thereon that when executed cause a system to perform a method supporting video processing load balancing for user account management in an associated computing environment the method comprising:
    providing a video encoding pool in the associated computing environment, wherein the video encoding pool comprises a set of nodes that are able to perform one or more video processing tasks for another node;
    receiving, by a managing server in the associated computing environment, a request for delegating a video processing task from a managed node;
    selecting, by the managing server, one or more nodes from the video encoding pool to perform the video processing task;
    coordinating, by the managing server, a distributing of the video processing task directly between the managed node and the one or more selected nodes of the video encoding pool if the managed node is permitted to communicate directly with the one or more selected nodes by:
        operating the managing server to indicate to the managed node the one or more selected nodes of the video encoding pool as one or more video processing task proxy nodes of the video encoding pool; and
    responsive to the managing server indicating the one or more video processing task proxy nodes, operating the managed node to distribute a plurality of user session screens as the video processing task to the one or more video processing task proxy nodes of the video encoding pool.

* * * * *

UNITED STATES PATENT AND TRADEMARK OFFICE
CERTIFICATE OF CORRECTION

PATENT NO. : 9,900,359 B2
APPLICATION NO. : 14/635758
DATED : February 20, 2018
INVENTOR(S) : Sharma et al.

Page 1 of 1

It is certified that error appears in the above-identified patent and that said Letters Patent is hereby corrected as shown below:

On the Title Page

On page 3, Column 1, under Other Publications, Line 26, delete "retreived" and insert -- retrieved --, therefor.

In the Claims

In Column 12, Line 58, in Claim 3, delete "grantinq" and insert -- granting --, therefor.

Signed and Sealed this
Fourth Day of September, 2018

Andrei Iancu
*Director of the United States Patent and Trademark Office*